US012290130B2

(12) United States Patent
Winters et al.

(10) Patent No.: US 12,290,130 B2
(45) Date of Patent: May 6, 2025

(54) PIVOT-ARM ASSEMBLY FOR A HELMET MOUNTED HEADSET

(71) Applicant: Gentex Corporation, Simpson, PA (US)

(72) Inventors: Nathan E. Winters, Merrimack, NH (US); David C. Rogers, Carbondale, PA (US); Michael D. Aaskov, Ketchum, ID (US)

(73) Assignee: Gentex Corporation, Simpson, PA (US)

( * ) Notice: Subject to any disclaimer, the term of this patent is extended or adjusted under 35 U.S.C. 154(b) by 117 days.

(21) Appl. No.: 16/810,170

(22) Filed: Mar. 5, 2020

(65) Prior Publication Data
US 2020/0196698 A1  Jun. 25, 2020

Related U.S. Application Data

(63) Continuation of application No. 15/108,358, filed as application No. PCT/US2015/011159 on Jan. 13, 2015, now Pat. No. 10,617,168.
(Continued)

(51) Int. Cl.
*A42B 3/30* (2006.01)
*A42B 1/24* (2021.01)
(Continued)

(52) U.S. Cl.
CPC .................. *A42B 3/30* (2013.01); *A42B 1/24* (2013.01); *A42B 3/04* (2013.01); *A42B 3/0406* (2013.01); *A42B 3/16* (2013.01); *G02B 23/12* (2013.01)

(58) Field of Classification Search
CPC ........... A42B 1/24; A42B 3/04; A42B 3/0406; A42B 3/30; A42B 3/16; G02B 23/12
(Continued)

(56) References Cited

U.S. PATENT DOCUMENTS 3,430,261 A * 3/1969 Benner .................. A42B 3/166
                                                                    381/376
3,461,463 A * 8/1969 Beguin .................. A42B 3/166
                                                                    381/376
(Continued)

FOREIGN PATENT DOCUMENTS

JP         61055030 U  *  4/1986

OTHER PUBLICATIONS

English translation of JP61055030 U (Year: 2018).*
(Continued)

*Primary Examiner* — Khaled Annis
*Assistant Examiner* — Dakota Marin
(74) *Attorney, Agent, or Firm* — Morgan, Lewis & Bockius LLP

(57) ABSTRACT

A pivot-arm assembly is provided for attaching an ear cup to a mounting feature on an exterior of a helmet. The pivot-arm assembly comprises a mount configured to releasably couple to the mounting feature. An arm has a first end configured to couple to the ear cup and a second end. A hinge is rotatable about a first axis and about a second axis. The hinge is coupled to the second end of the arm and disposed between the second end of the arm and the mount such that the first end of the arm is rotatable relative to the mount about the first axis and the first end of the arm is rotatable relative to the mount about the second axis. A biasing member is coupled to the arm and is configured to spring bias the first end of the arm relative to the mount in a rotatable direction about the second axis of the hinge.

25 Claims, 18 Drawing Sheets

Related U.S. Application Data

(60) Provisional application No. 61/927,204, filed on Jan. 14, 2014.

(51) Int. Cl.
*A42B 3/04* (2006.01)
*A42B 3/16* (2006.01)
*G02B 23/12* (2006.01)

(58) Field of Classification Search
USPC ............................................................ 2/422
See application file for complete search history.

(56) References Cited

U.S. PATENT DOCUMENTS

| | | | | |
|---|---|---|---|---|
| 3,721,993 A * | 3/1973 | Lonnstedt | ............... | A61F 11/14 2/209 |
| 4,069,512 A * | 1/1978 | Palmaer | ................. | A42B 3/166 2/209 |
| 4,104,743 A | 8/1978 | Bottger | | |
| 4,109,320 A | 8/1978 | Anderson | | |
| 4,287,614 A * | 9/1981 | Lonnstedt | ............... | A42B 3/166 381/189 |
| 4,347,631 A * | 9/1982 | Newcomb | ............... | A42B 3/166 381/189 |
| 4,391,000 A | 7/1983 | Lonnstedt | | |
| 4,944,361 A * | 7/1990 | Lindgren | ............... | A42B 3/166 181/129 |
| 5,339,464 A * | 8/1994 | Dor | ...................... | G02B 23/125 2/6.2 |
| 5,546,610 A * | 8/1996 | Herzig | ................... | A42B 3/166 2/424 |
| 6,115,846 A | 9/2000 | Truesdale | | |
| 7,908,667 B2 | 3/2011 | Rogers et al. | | |
| 8,166,575 B2 * | 5/2012 | Haselmayer | ........... | A42B 3/166 2/422 |
| 10,617,168 B2 * | 4/2020 | Winters | .................... | A42B 3/30 |
| 2002/0104192 A1 * | 8/2002 | Iguchi | ..................... | A44C 5/12 16/386 |
| 2007/0226865 A1 * | 10/2007 | Lindgren | ............... | A42B 3/166 2/6.2 |
| 2008/0092278 A1 * | 4/2008 | Rogers | ................. | A42B 3/0406 2/422 |
| 2011/0314594 A1 * | 12/2011 | Rogers | .................... | A42B 3/04 2/421 |
| 2012/0002046 A1 | 1/2012 | Rapoport et al. | | |
| 2012/0317706 A1 * | 12/2012 | Lebel | ........................ | F41H 1/08 2/422 |
| 2013/0219598 A1 * | 8/2013 | Pfanner | ................. | A42B 3/166 2/423 |
| 2015/0208749 A1 | 7/2015 | Carroll | | |

OTHER PUBLICATIONS

International Search Report dated Mar. 27, 2015 for International Patent Application No. PCT/US2015/011159.

Written Opinion of the International Searching Authority dated Mar. 27, 2015 for International Patent Application No. PCT/US2015/011159.

Extended European Search Report dated Jul. 28, 2017 for European Patent Application No. EP15737006, 7 pages.

* cited by examiner

PIVOT-ARM ASSEMBLY FOR A HELMET MOUNTED HEADSET

CROSS-REFERENCE TO RELATED APPLICATIONS

This application is a continuation of U.S. patent application Ser. No. 15/108,358 filed Jun. 27, 2016, which is a U.S. National Stage of International Patent Application No. PCT/US2015/011159, filed Jan. 13, 2015, which claims the benefit of U.S. Provisional Patent Application No. 61/927,204 filed Jan. 14, 2014 entitled "Helmet Mounted Headset", each of which is incorporated by reference herein in its entirety.

BACKGROUND OF THE INVENTION

The present invention generally relates to a pivot-arm assembly for a helmet mounted headset.

BRIEF SUMMARY OF THE INVENTION

In one embodiment there is a pivot-arm assembly for attaching an ear cup to a mounting feature on an exterior of a helmet, the pivot-arm assembly comprising: a mount configured to releasably couple to the mounting feature; an arm having a first end configured to couple to the ear cup and a second end; a hinge rotatable about a first axis and about a second axis, the hinge being coupled to the second end of the arm and disposed between the second end of the arm and the mount such that the first end of the arm is rotatable relative to the mount about the first axis and the first end of the arm is rotatable relative to the mount about the second axis; and a biasing member coupled to the arm and configured to spring bias the first end of the arm relative to the mount in a rotatable direction about the second axis of the hinge.

In a further embodiment, the pivot-arm assembly includes a lock configured to releasably retain the first end of the arm in a predetermined rotational position relative to the second axis. In one embodiment, the lock includes a plate having a multi-lobed slot and a spring-biased protrusion extending through the multi-lobed slot, the protrusion being engageable with the multi-lobed slot to lock a rotational position of the first end of the arm relative to the second axis in a first position when the protrusion engages a first lobe of the multi-lobed slot and lock the rotational position of the first end of the arm relative to the second axis in a second position when the protrusion engages a second lobe of the multi-lobed slot. In one embodiment, the protrusion is engageable with the multi-lobed slot to lock a rotational position of the first end of the arm relative to the second axis in a third position when the protrusion engages a third lobe of the multi-lobed slot.

In one embodiment, the multi-lobed slot is shaped and configured so that rotational movement of the first end of the arm about the second axis causes the lock to transition from the first position to the second position. In one embodiment, the multi-lobed slot is shaped and configured so that rotational movement of the first end about the second axis causes the lock to transition from the second position to the third position. In a further embodiment the pivot-arm assembly includes a release coupled to the protrusion, wherein depression of the release urges the protrusion into the first position. In one embodiment, the lock and the hinge are surrounded by a common housing. In a further embodiment, the pivot-arm assembly includes a release configured to selectively release the lock. In one embodiment, the lock is configured to releasably retain the first end of the arm in two or more predetermined angular positions relative to the second axis.

In a further embodiment, the pivot-arm assembly includes the mounting feature coupled to the second end. In one embodiment, the mounting feature includes a dovetail groove with at least a portion of the dovetail groove positioned on the helmet behind the wearer's ear, the mount including a dovetail projection configured to mount in the dovetail groove. In one embodiment, the hinge is a first hinge, the pivot-arm assembly further comprising: a second hinge coupled to the first end of the arm. In one embodiment, the second hinge includes a gimbal attachment. In a further embodiment, the pivot-arm assembly includes the ear cup coupled to the first end. In one embodiment, the biasing member is coupled to the hinge. In one embodiment, the biasing member includes a torsion spring. In one embodiment, the arm has an adjustable telescoping length. In one embodiment, the first axis of the hinge is generally perpendicular to the second axis of the hinge. In one embodiment, the first end is freely rotatable about the first axis of the hinge. In one embodiment, the mount includes a dovetail projection.

In another embodiment, there is a pivot-arm assembly for attaching an ear cup to a mounting feature of a helmet, the pivot-arm assembly comprising: an ear cup; and a mount configured to releasably couple to a mounting feature on the helmet; an arm having a first portion coupled to the ear cup, the arm having a second portion moveably coupled to the first portion to adjust a length of the arm; a hinge having a first part rotatable about a first axis and second part rotatable about a second axis, the first axis being generally perpendicular to the second axis, the first part of the hinge being coupled to the mount and the second part of the hinge being coupled to the second portion such that the first portion of the arm is rotatable relative to the mount about the first axis and the first portion of the arm is rotatable relative to the mount about the second axis, the second part of the hinge having a torsion spring coupled to the first portion of the arm and configured to spring bias the first portion of the arm relative to the mount in a rotatable direction about the second axis of the hinge, the second part of the hinge having a lock configured to releasably retain the first portion of the arm in a predetermined angular position relative to the second axis, the second part of the hinge having a release configured to selectively release the lock.

In a further embodiment, the pivot-arm assembly includes a deployed position defined by when the mount is mounted to the mounting feature and the ear cup is biased against the wearer's head; a locked position defined by when the mount is mounted to the mounting feature, the lock retains the first portion of the arm in the predetermined angular position and the ear cup is positioned over the wearer's ear, the ear cup is spaced from the wearer's head; and a stowed position defined by when the mount is mounted to the mounting feature and the ear cup is positioned over a back portion of the helmet, the ear cup is biased against the back portion of the helmet.

BRIEF DESCRIPTION OF THE SEVERAL VIEWS OF THE DRAWINGS

The following detailed description of embodiments of the pivot-arm assembly for a helmet mounted headset, will be better understood when read in conjunction with the appended drawings of an exemplary embodiment. It should In the drawings.

DETAILED DESCRIPTION OF THE INVENTION

Figure 1:
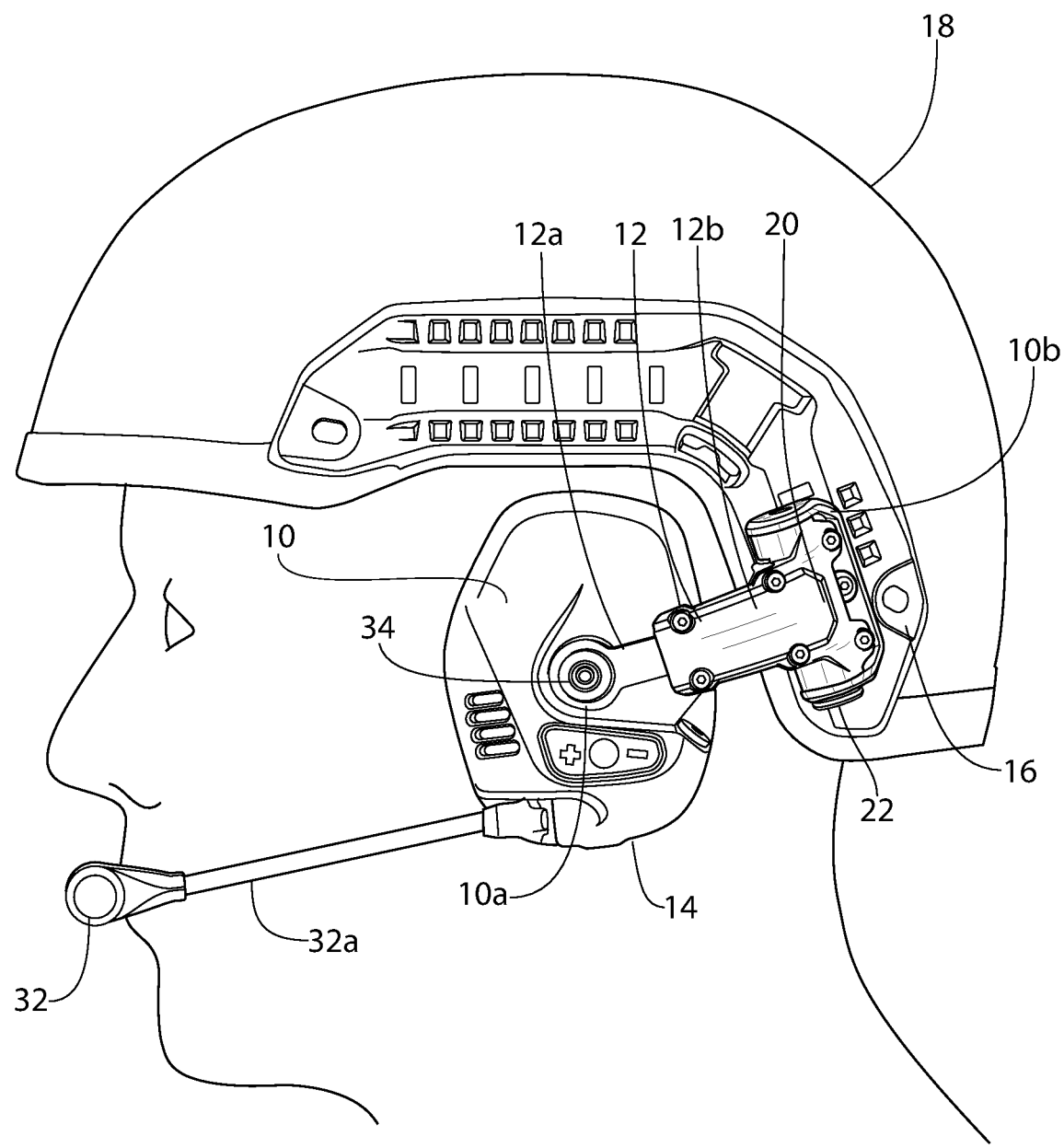
FIG. 1 is a side view of the helmet mounted headset in accordance with an exemplary embodiment of the present invention shown in the deployed position.

Referring to the drawings in detail, wherein like reference numerals indicate like elements throughout, there is shown in FIGS. 1-18 a pivot-arm assembly for a helmet mounted headset, generally designated 10, in accordance with an exemplary embodiment of the present invention. The pivot-arm assembly 10 may also be generally referred to as a pivot-arm or a helmet mounted headset.

Ear accessories (e.g., communications devices integrated within a padded earphone or ear cup) can be critical in numerous helmet deployments; for example, the need for both protection and communication is particularly important in military, fire-fighter, rescue and similar activities. Ear accessories have been built into the helmet and worn separately beneath the helmet. An example of a helmet with built-in earphones is the present military helmet known as the Combat Vehicle Crew (CVC) helmet. Unfortunately, because the earphones add weight and do not function in dismounted operations, and cannot be removed from the CVC helmet, the vehicle crew members are issued two helmets—the CVC helmet and a standard infantry helmet. Other helmets having a mounted headset lack the functionality and performance of the helmet mounted headset disclosed herein.

Referring to FIG. 1, the pivot-arm assembly 10 includes an arm or coupling mechanism 12 configured to attach an ear cup 14 to a mounting feature 16 on the exterior of a helmet 18. A second pivot-arm assembly (not shown) may be mounted to the other lateral side of the helmet 18 in a mirrored configuration to the illustrated pivot-arm assembly 10. The pair of pivot-arm assemblies may be mirror configurations except for details of the ear cups such a microphone 32. The pivot-arm assembly 10 may be provided to the consumer in pairs or individually. In some embodiments, the ear cup 14 and/or mounting feature 16 are provided with the pivot-arm assembly 10 as a kit. In some embodiments, the ear cup 14 and/or mounting feature 16 are provided separately such that the arm 12 is initially unattached to anything.

Figure 3:
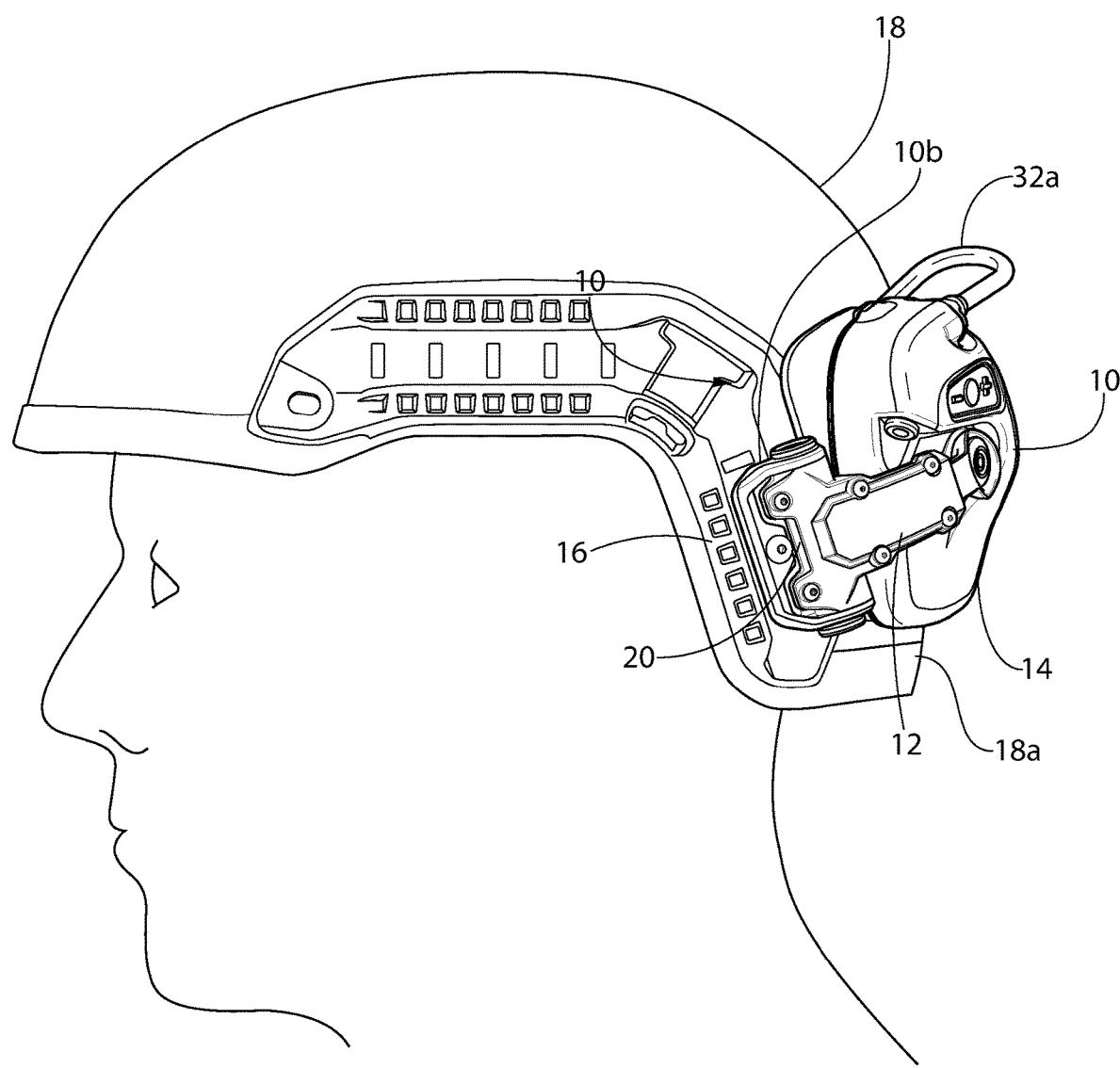
FIG. 3 is a side view of the helmet mounted headset of FIG. 1 shown in the stowed position.
Figure 6:
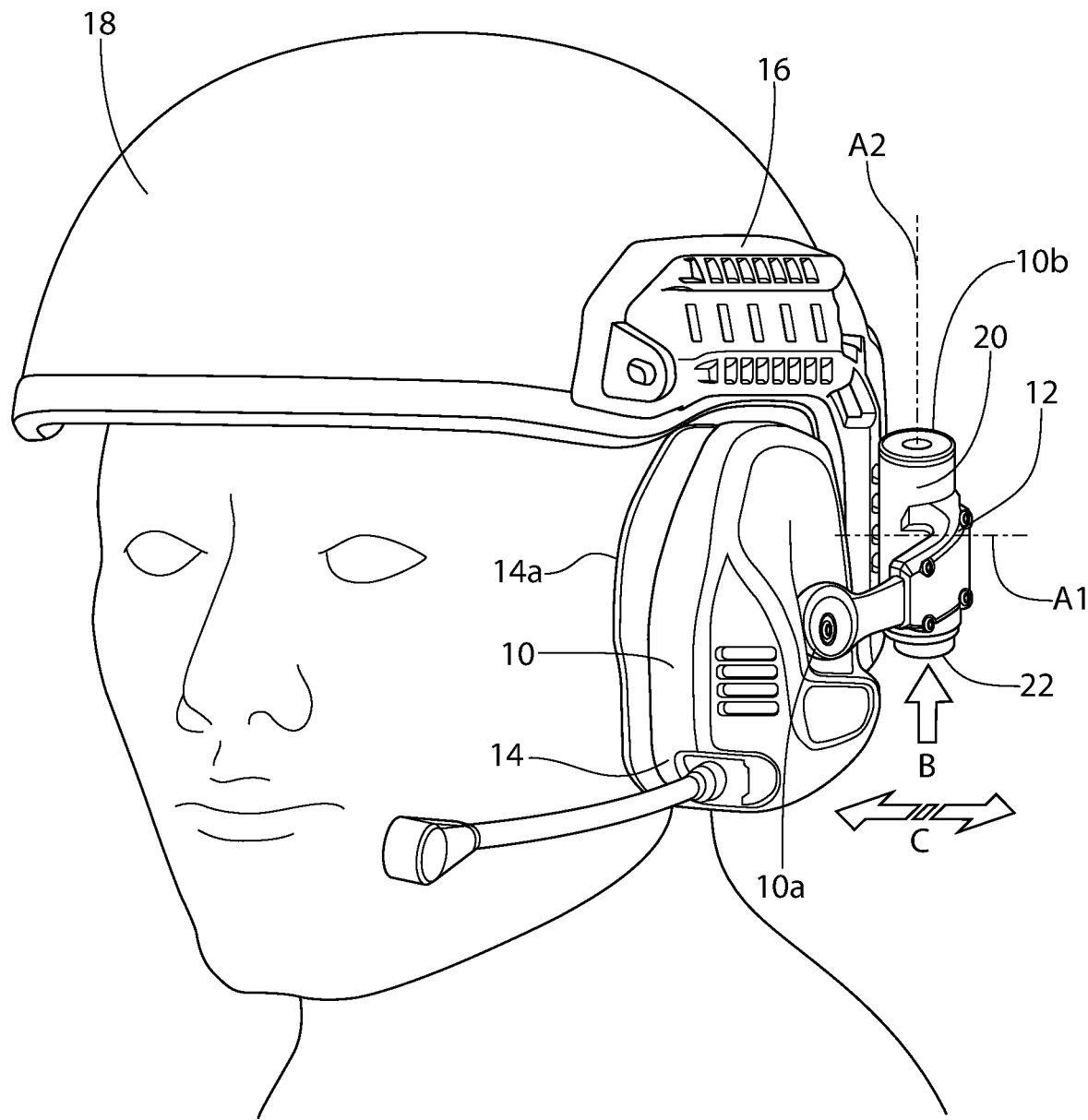
FIG. 6 is a front perspective view of the helmet mounted headset of FIG. 1 shown in the deployed position and illustrating actuation of the release button and lateral movement of the ear cup.

In some embodiments, the pivot-arm assembly 10 may allow for the headset 10 to be mounted to a helmet 18 and positioned against the wearer's ear during use (i.e., a deployed position, see FIG. 1) and stowed away from the wearer's ear when not in use (i.e., a stowed position, see FIGS. 3 and 6). In one embodiment, the stowed position allows for a very low profile on the helmet 18. In one embodiment, the ear cups 14 are not visible from a front view of the helmet (i.e., looking at the wearer head on) in the stowed position. In some embodiments, the pivot-arm assembly 10 may extend over but be spaced from the wearer's ear in one or more positions (i.e., a locked position or float position, see FIG. 7).

Referring to FIG. 1, the arm 12 has a first end 10a and a second end 10b, the first end 10a being coupled to the ear cup 14 and the second end being releasably coupled to the mounting feature 16. The first end 10a may be releasably or fixed to the ear cup 14.

In one embodiment, the ear cup 14 is configured to restore "natural hearing" with the outside environment for improved situational awareness while at the same time providing for hearing protection. The ear cup 14 may be a circumaural ear cup. In one embodiment, the ear cup 14 includes a cushion 14a. In one embodiment, cushion 14a is configured to be contoured to match the geometry of the wearer's head and provide a better seal and proper attenuation. At least one of the ear cups 14 may include a microphone 32. In one embodiment, ear cup 14 includes a boom arm 32a. The boom arm 32a may be flexible such that the user can bend boom arm 32a and place the microphone 32 a desired distance from the user's mouth.

Referring to FIG. 6, a hinge 20 may be provided to position the ear cup 14 relative to the helmet 18 in a plurality of positions. The hinge 20 may be rotatable about a first axis A1 and about a second axis A2. The hinge 20 may be coupled between the second end 10b or mount 36 (see FIG. 14) and the second end of the arm 12 such that the first end 10a of the arm 12 is rotatable relative to the mount 36 about the first axis A1 and the first end of the arm 10a is rotatable relative to the mount 36 about the second axis A2. In one embodiment, the first end 10a is spring biased in a rotatable direction (e.g., toward the wearer's ear) about the second axis A2 of the hinge 20. By providing the hinge 20 with at least two degrees of freedom and a spring bias in at least one direction, the ear cup 14 may be held against the wearer's ear and easily moved out of the way to a float and/or stowed position using one hand. In some embodiments, the ear cup 14 may be selectively biased against the wearer's ear in a deployed position and spaced from the wearer's ear in one or more float or locked positions.

Referring to FIG. 1, the pivot-arm assembly 10 may have a deployed position defined by when the second end 10b of the pivot-arm is mounted to the mounting feature 16, the first end 10a is positioned proximate a wearer's ear and the release button 22 is actuated, the ear cup 14 is biased against the wearer's ear. In the deployed position, the cushion 14a may be pressed against the wearer's head when the ear cup 14 is being used.

Figure 7:
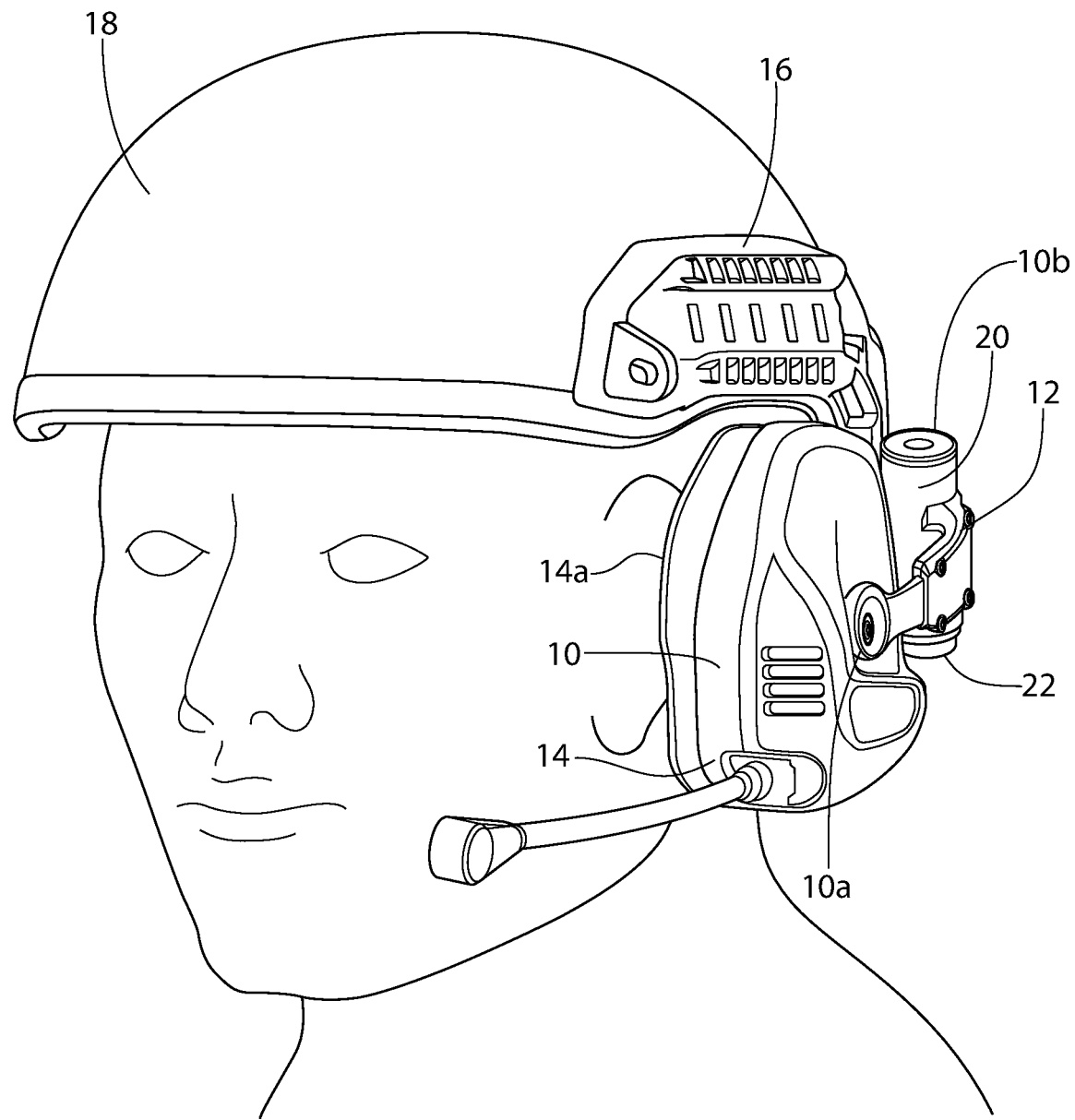
FIG. 7 is a front perspective view of the helmet mounted headset of FIG. 1 shown in the locked position and illustrating actuation of the release button and lateral movement of the ear cup.

Referring to FIG. 7, the pivot-arm assembly 10 may have one or more locked positions defined by when the second end 10b is mounted to the mounting feature 16, the first end 10a is positioned proximate a wearer's ear and a lock 30 (see FIG. 11) retains the first end 10a in the predetermined angular position, the ear cup 14 is spaced from the wearer's ear. In the locked position, the ear cup 14 may be used in certain circumstances (e.g., to allow for more access to outside noise or to relieve the biasing force against the wearer's head from the cushion 14a) and/or moved to the stowed position. In one embodiment, the pivot-arm assembly 10 includes two or more locked positions for spacing the cushion 14a from the ear in one of a plurality of distances.

Referring to FIG. 3, the pivot-arm assembly 10 may have a stowed position defined by when the second end 10b is mounted to the mounting feature 16 and the first end 10a is positioned proximate a back portion 18a of the helmet 18, the ear cup 14 extends over the back portion 18a of the helmet 18.

Figure 4:
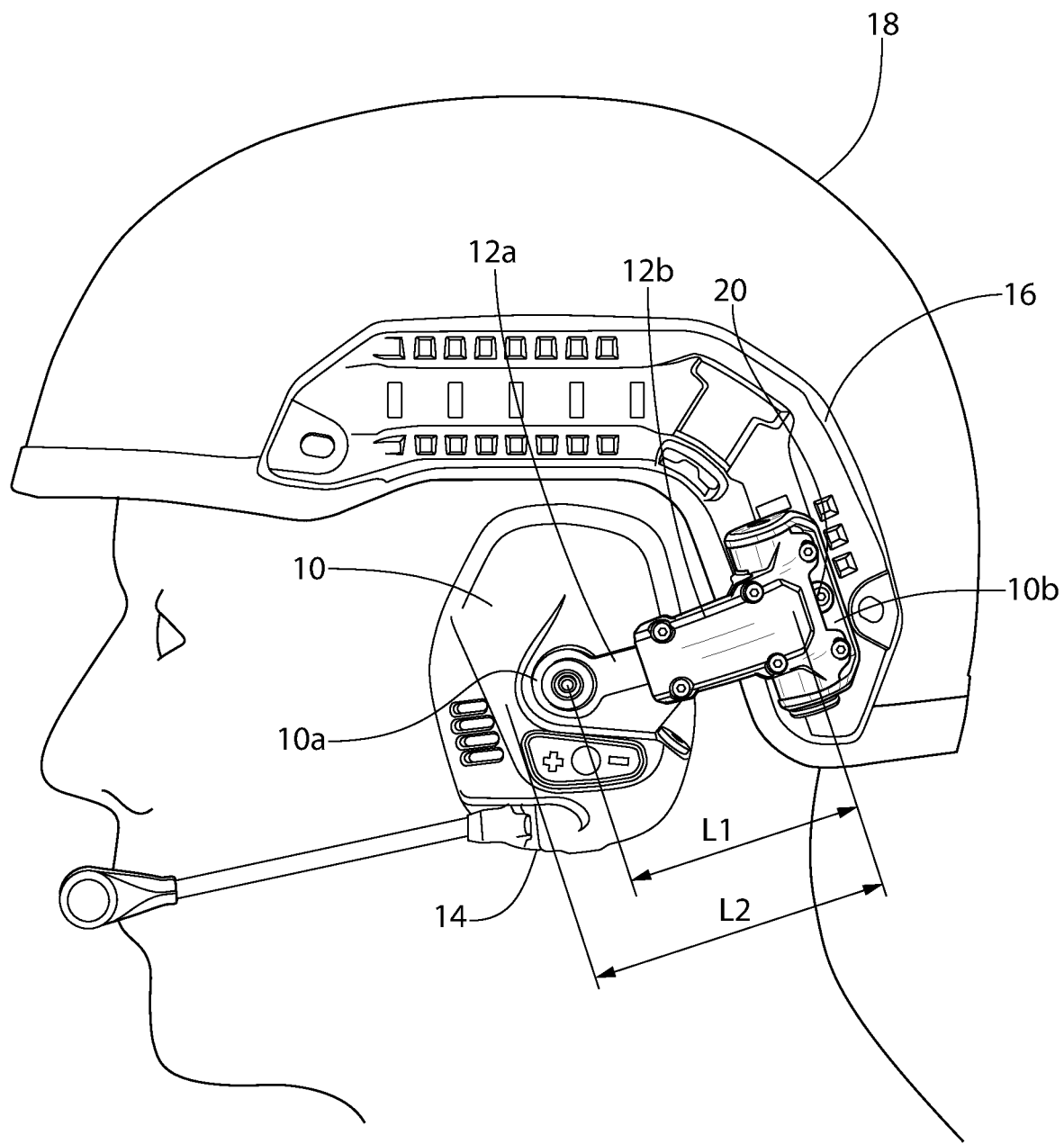
FIG. 4 is a side view of the helmet mounted headset of FIG. 1 illustrating the adjustability of the pivot-arm.
Figure 5:
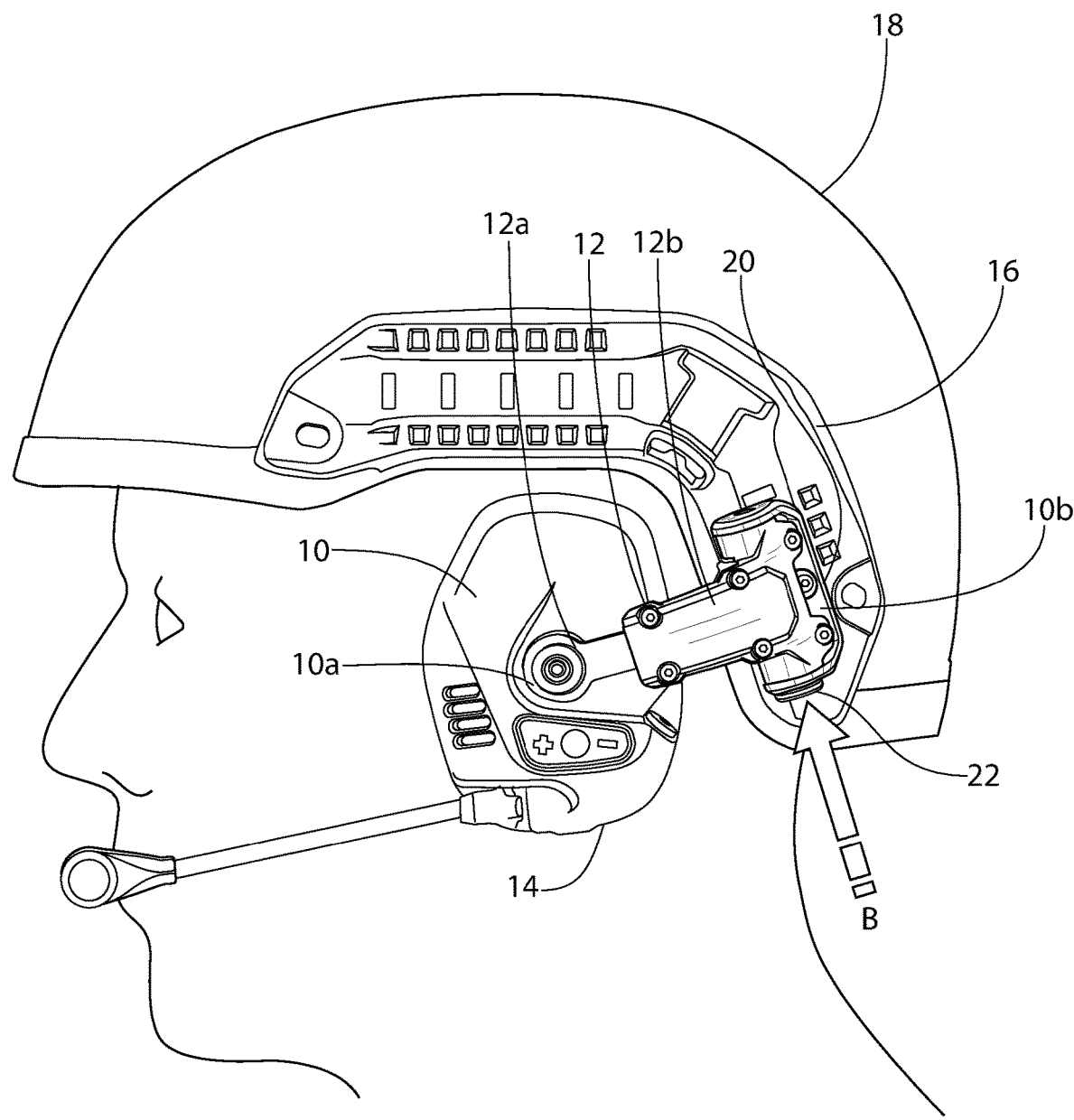
FIG. 5 is a side view of the helmet mounted headset of FIG. 1 illustrating actuation of the release button.

Referring to FIG. 4, the arm 12 may include two or more segments 12a, 12b that are moveable with respect to one another to adjust the length L1 of the arm 12 to another length L2 and fit the anatomy of the particular user. For example, a first person's ear may be spaced a different distance from the mounting feature 16 for the same helmet worn by a second person. The two or more segments 12a, 12b may be telescopically coupled to one another. In one embodiment, the arm 12 includes a first segment 12a and a second segment 12b. In one embodiment, the first segment 12a telescopically slides into the second segment 12b. In other embodiments, the second segment 12b slides into the second segment 12b or they are slidable in front or behind the other.

In one embodiment, the first segment 12a is friction fit with the second segment 12b. This may allow for a user to adjust the length of arm 12 with one hand when the pivot-arm assembly 10 is mounted to the helmet 18. In one embodiment, the first segment 12a is friction fit with the second segment 12b such that to move the first segment 12a relative to the second segment 12b, a force of greater than approximately 1 lbF parallel to a linear axis of motion is required. In one embodiment, the first segment 12a and/or the second segment 12b includes indents and/or an audible click to indicate the length L1, L2 of the arm 12. In other embodiments, the first segment 12a and second segment 12b are adjustable via an attachment mechanism such as a worm gear and rack.

In one embodiment, the first segment 12a and the second segment 12b are generally rigid. In other embodiments, the first segment 12a and the second segment 12b are flexible. The arm 12 may have a curved shape in order to properly position the ear cup 14 over the user's ear in the deployed position and allow for a streamlined configuration in the stowed position. The first segment 12a and the second segment 12b may be comprised of different materials from one another. In one embodiment, the first segment 12a is comprised of metal and the second segment 12b is comprised of plastic.

Referring to FIGS. 6 and 7, the hinge 20 may have two or more degrees of freedom. In one embodiment, hinge 20 has two degrees of rotational freedom. In one embodiment, hinge 20 is provided proximate the second end 10b of the pivot-arm assembly 10 close to the mounting feature 16. In one embodiment, the hinge 20 extends over the mounting feature 16 when the pivot-arm assembly is mounted to the mounting feature 16. In one embodiment, the hinge 20 extends over a portion of the helmet 12 when the pivot-arm assembly is mounted to the mounting feature 16. The hinge 20 may be configured to rotate the arm 12 relative to mount 36 or mounting feature 16 about the first axis A1 to position the ear cup 14 proximate a wearer's ear when in use and facilitate rotation of the ear cup to a stowed position behind the helmet when not in use. The hinge 20 may also be configured to rotate arm 12 relative to mount 36 or mounting feature 16 about a second axis A2 to move the ear cup 14 toward and away from the wearer's ear. In one embodiment, the first axis A1 is generally perpendicular to the second axis A2. In one embodiment, the first axis A1 is not coplanar with the second axis A2. In other embodiments, the first axis A1 is coplanar with the second axis A2.

In one embodiment, the hinge 20 has a first part rotatable about the first axis A1 and second part rotatable about the second axis A2. The first part of the hinge may coupled to the mount and the second part of the hinge 20 may be coupled to the second portion 12b of the arm 12. In one embodiment the first part of the hinge 20 is coupled to the second part of the hinge 20. In other embodiments, the first part of the hinge 20 is indirectly coupled to the second part of the hinge 20 by a spacer element. In some embodiments, the first and second parts of the hinge 20 are collectively referred to as a single hinge.

Referring to FIG. 1, the first end of the arm 12 may be coupled to the ear cup 14 by a second hinge 34. The hinge 34 may be configured to allow the ear cup 14 to pivot and/or rotate relative to the arm 12 and position the ear cup 14 to the desired position relative to the wearer's ear. In one embodiment, hinge 34 is a gimbal attachment 34. In one embodiment, the hinge 34 is configured to allow the ear cup 14 to pivot up to approximately 5 degrees in any direction from a base plane normal to the hinge's 34 center axis. In one embodiment, the hinge 34 is configured to allow the ear cup 14 to pivot up to approximately 10 degrees in any direction from a base plane normal to the hinge's 34 center axis. In one embodiment, the hinge 34 is configured to allow the ear cup 14 to pivot up to approximately 15 degrees in any direction from a base plane normal to the hinge's 34 center axis. In one embodiment, the hinge 34 is configured to allow the ear cup 14 to pivot up to approximately 20 degrees in any direction from a base plane normal to the hinge's 34 center axis. In one embodiment, the hinge 34 is configured to allow the ear cup 14 to pivot up to approximately 20 degrees in any direction from a base plane normal to the hinge's 34 center axis.

The hinge 34 may be configured to allow the ear cup 14 to rotate about hinge's 34 center axis. In one embodiment, the hinge 34 is configured to allow the ear cup 14 to rotate 360° about hinge's 34 center axis. Once moved to the desired position, the hinge 34 may be retained in place by friction. The friction force may sufficiently high to retain the ear cup 14 in normal operating conditions such as movement of the head while sufficiently low to allow the user to adjust the position of the ear cup 14 relative to the arm 12 with one hand. In other embodiments, the hinge 34 includes a locking mechanism to retain the hinge 34 in the desired position.

Figure 8:
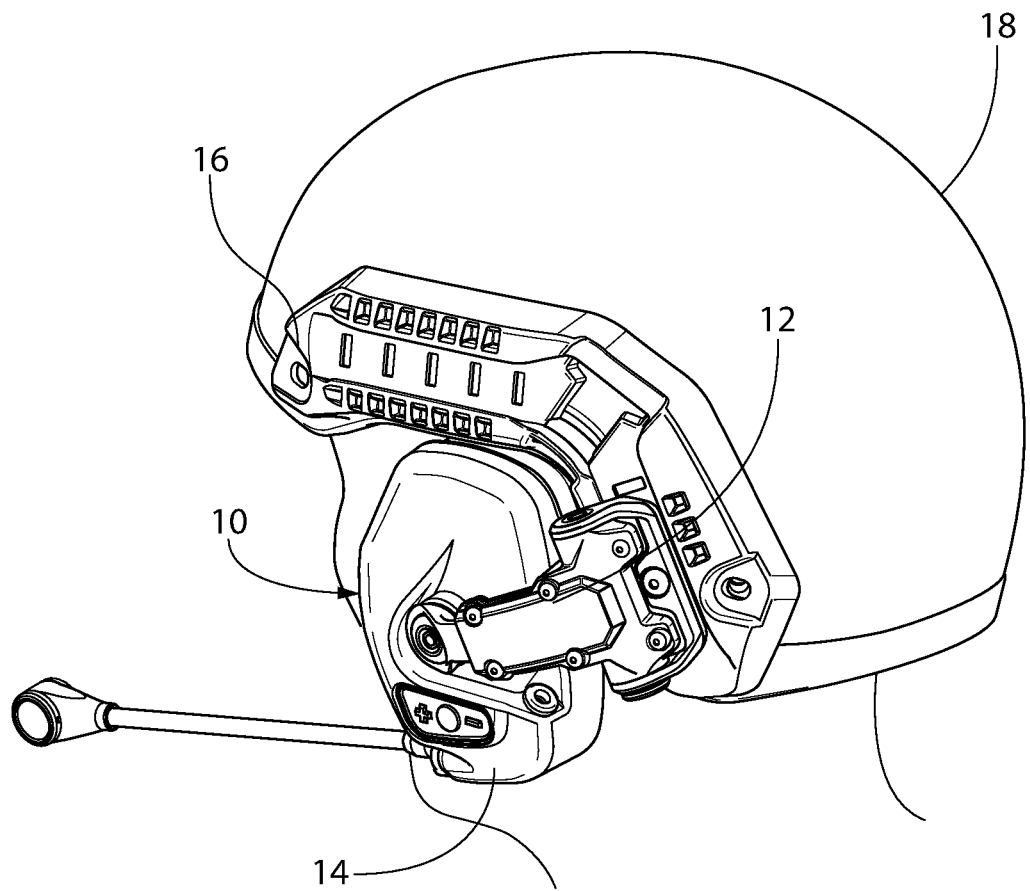
FIG. 8 is a rear perspective view of the helmet mounted headset shown in FIG. 1.
Figure 9:
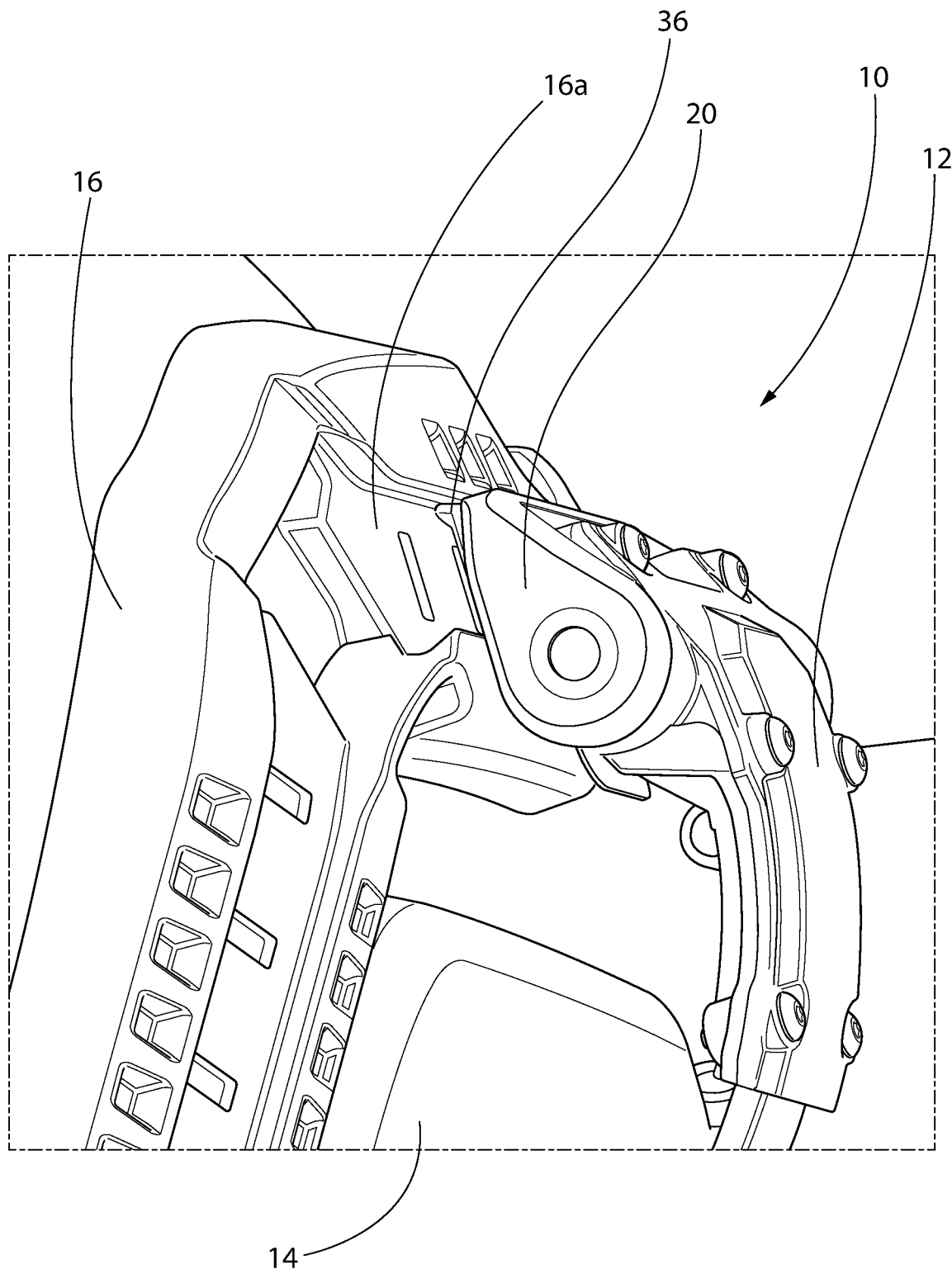
FIG. 9 is an enlarged top perspective view of the pivot-arm attached to the mounting rail shown in FIG. 8.

Referring to FIGS. 8 and 9, the second end 10b of the pivot-arm assembly 10 may be coupled to a mounting feature 16. In one embodiment, pivot-arm assembly 10 is releasably coupled to the mounting feature 16. In one embodiment, the mounting feature 16 includes a dovetail groove 16a. In one embodiment, the mounting feature 16 is a rail (e.g., an Accessory Rail Connectors (ARC)) as disclosed in U.S. Pat. No. 7,908,667 which is hereby incorporated by reference in its entirety. In one embodiment, at least a portion of the dovetail groove 16a is positioned on the helmet 18 behind the wearer's ear. In one embodiment, the headset 10 attaches to the rear portion of the mounting features 16, leaving the top portion of the mounting feature 16 free for mounting other accessories to the helmet such as lights, cameras, etc. The second end 10b may include a mount 36 (see FIG. 14).

Referring to FIGS. 9, 14, 16 and 17, the mount 36 may have a dovetail shape projection corresponding to the dovetail shape of the dovetail groove 16a of the mounting feature 16. In one embodiment, the mount 36 has parallel sides to allow for the mount 36 to be slid along the dovetail groove 16a of the mounting feature 16. The second end 10b may further include a locking mechanism 36a. In one embodiment, the locking mechanism 36a is a spring biased tab that retains the mount 36 in the mounting feature 16 when released and allows the second end 10b to be moved and/or removed from the mounting feature 16 when depressed. In one embodiment, mount 36 is coupled to the hinge 20. In other embodiments, mount 36 is indirectly coupled to the hinge 20 by a spacer element.

The hinge 20 may include a lock 30 (see FIG. 11) configured to releasably retain the first end 10a in a predetermined angular position relative to the second axis A2. In one embodiment, the lock 30 is configured to releasably retain the first end 10a in two or more predetermined angular positions relative to the second axis A2. The lock may include a release button 22 configured to selectively release the lock 30. The release button 22 may extend along the second axis A2. In on embodiment, the release button 22 extends downwardly from the hinge 20 when the pivot-arm assembly 10 is mounted to the helmet 18 such that the user can release the release button 22 with their thumb while grasping the ear cup 14 with the remainder of their hand. In other embodiments, the release button 22 includes a lever or a knob.

Referring to FIGS. 2, 3, 6 and 7, the hinge 20 may be spring biased toward the wearer's ear in the lateral direction (e.g., about the second axis A2) in order to keep the ear cup 14 in the desired position relative to the wearer's ear. The hinge 20 may be spring biased toward the wearer's ear such that the ear cup 14 is held against the wearer's ear and is retained there by the spring force. In one embodiment, the hinge 20 includes a lock 30 to releasably retain the ear cup 14 away from the wearer's ear two or more predetermined positions. Said another way, the lock 30 may be configured to retain the arm 12 in two or more angular positions relative to axis A2. The hinge 20 may include a release 22 configured to release the lock 30 when actuated. The hinge 20 may allow for the ear cup 14 to be rotated about second axis A2 a sufficient distance to clear the helmet edge when transitioning the pivot-arm assembly 10 from the locked position to the stowed position (see arrow R in FIG. 2). In one embodiment, arm 12 is rotatable relative to the mounting feature 16 approximately 180 degrees (see FIG. 2). In one embodiment, arm 12 is rotatable relative to mounting feature 16 about axis A2 approximately 25 degrees from the deployed position to the first locked position. In one embodiment, arm 12 is rotatable relative to mounting feature 16 about axis A2 approximately 15 degrees from the first position to the second locked position.

In one embodiment, there are three positions of the arm 12 relative to the mount 36 with the ear cup 14 aligned with the wearer's ear. If the deployed position is considered the start position (0 degrees) then first click to a locked position of the arm 12 is 40 degrees from that, which is a first lock position or float position of the ear cushion 14a just off the user's head. In the float position, the ear cushion 14a may be touching the user depending on the user's head width, but there will be no sealing or ear protection, allowing the user to hear past the seal or the ear cushion 14a). The next click position would be 20 degrees from the float position to the second locked position. This position puts the earcup 14 out further from the user to clear the helmet 12 when stowing the pivot-arm assembly 10, so the user does not need to actively fight the spring pressure when transferring the pivot-arm assembly 10 to the stowed position. In one embodiment, there is an over-travel allowance for the arm 12 to be pulled another 5 degrees from the second locked position to help with rotation without a third locked position. In other embodiments, there are additional locked positions to position the earcup 14 in the desired position.

Figure 10:
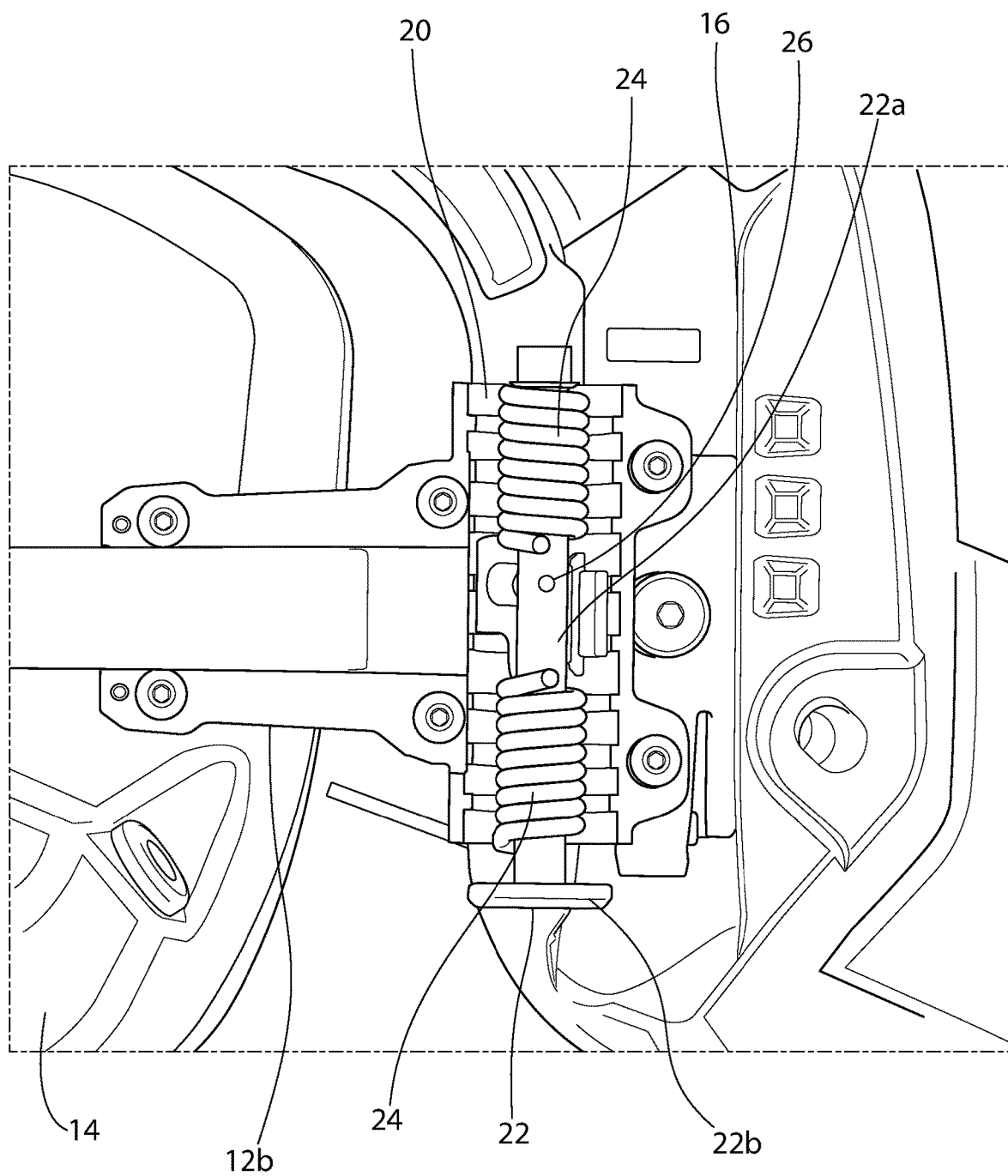
FIG. 10 is a first partially cut away side view of the hinge for the helmet mounted headset of FIG. 1.
Figure 11:
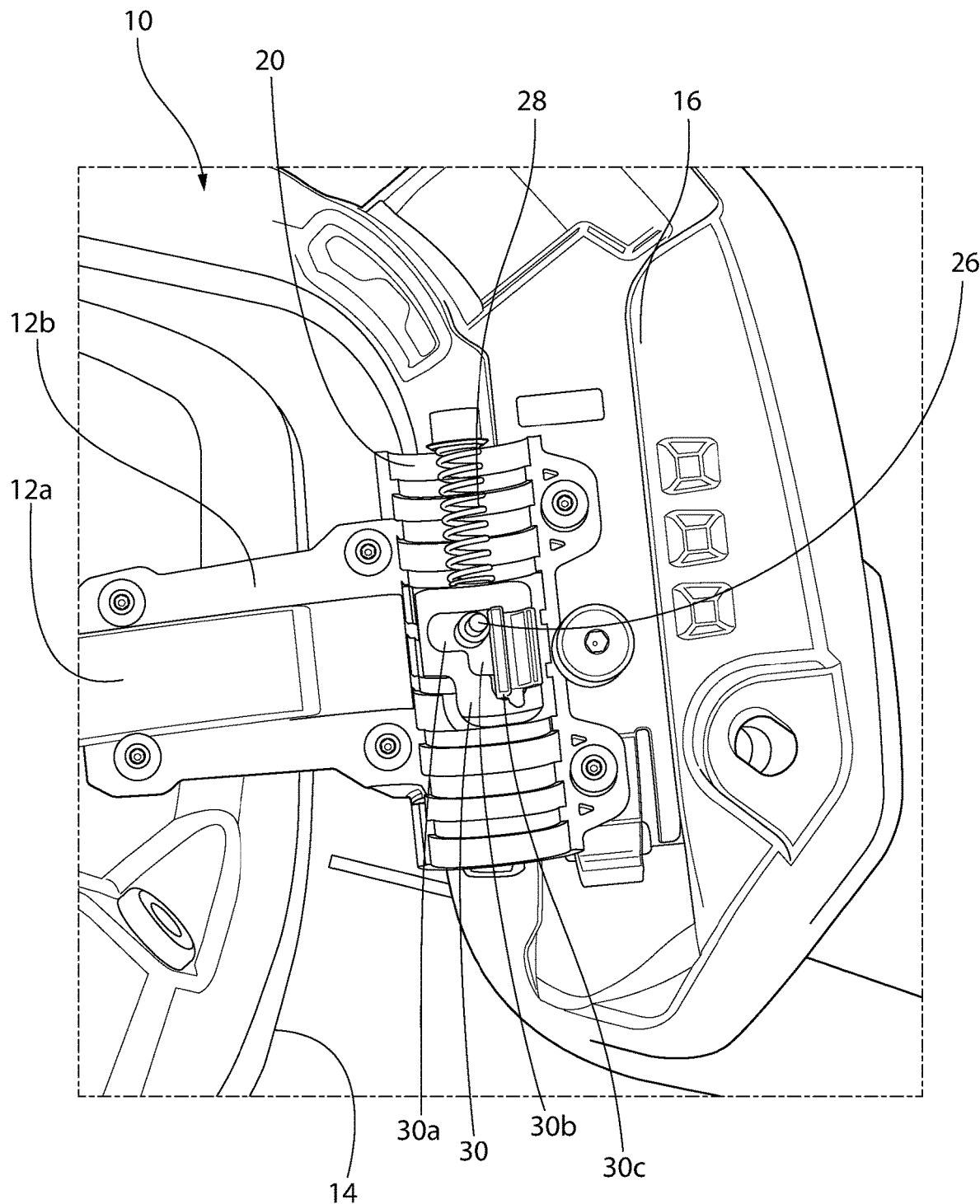
FIG. 11 is a second partially cut away side view of the hinge for the helmet mounted headset of FIG. 1.
Figure 12:
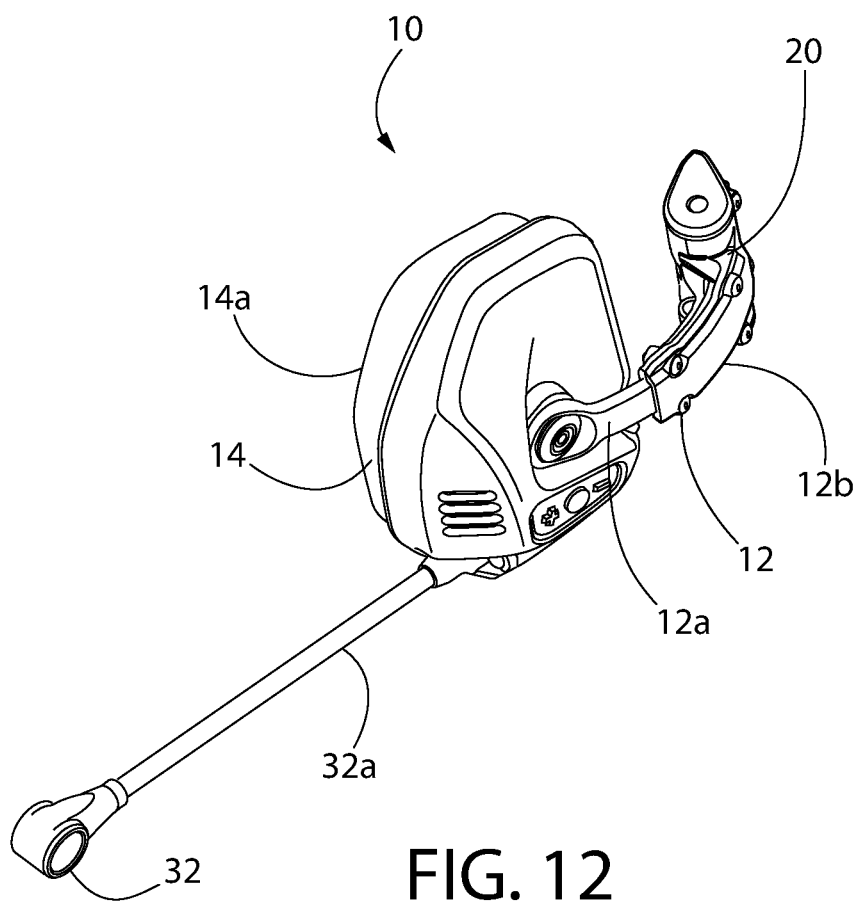
FIG. 12 is a perspective view of the helmet mounted headset of FIG. 1.
Figure 13:
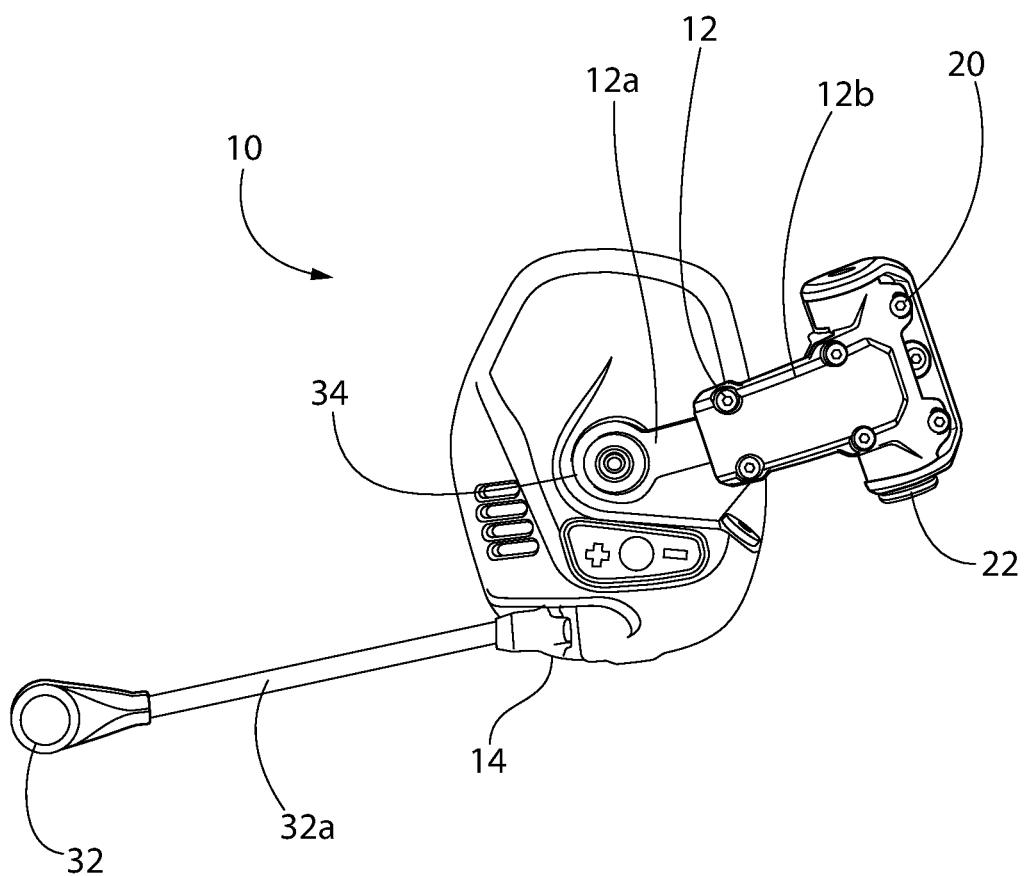
FIG. 13 is a left side view of the helmet mounted headset of FIG. 1.
Figure 14:
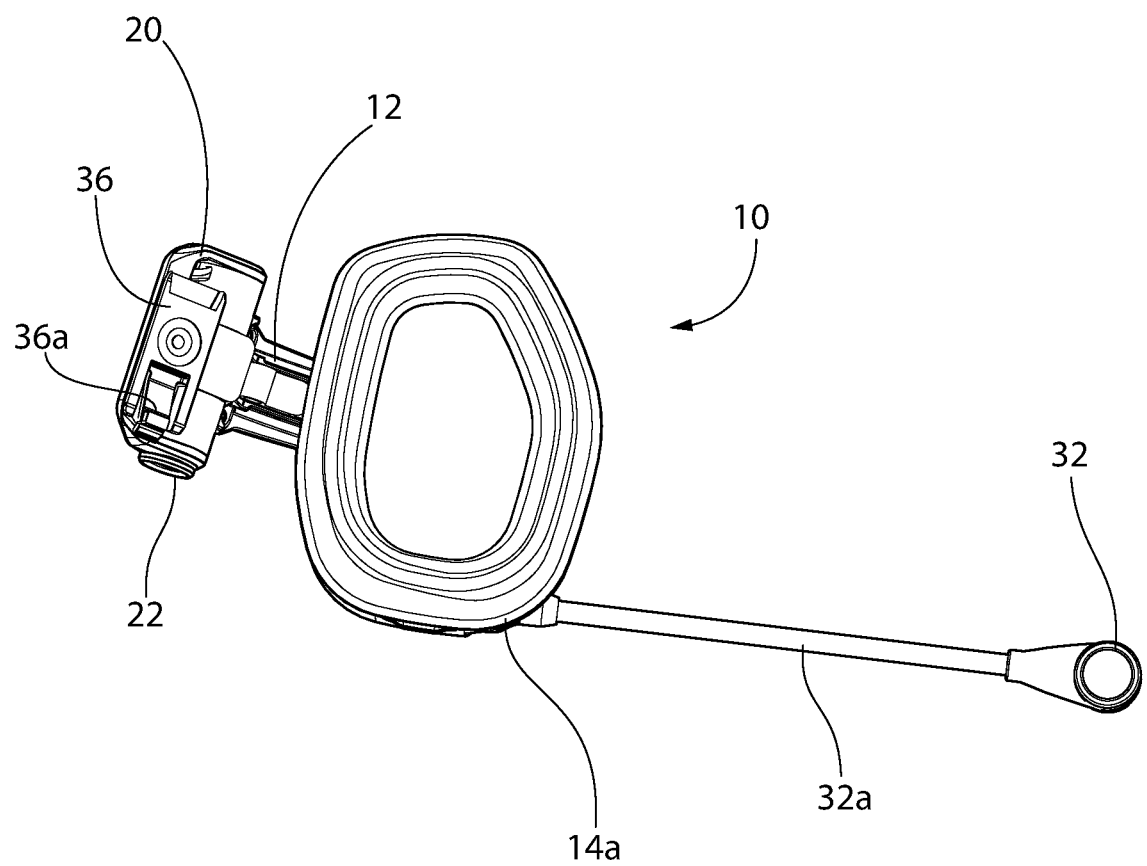
FIG. 14 is a right side view of the helmet mounted headset of FIG. 1.
Figure 15:
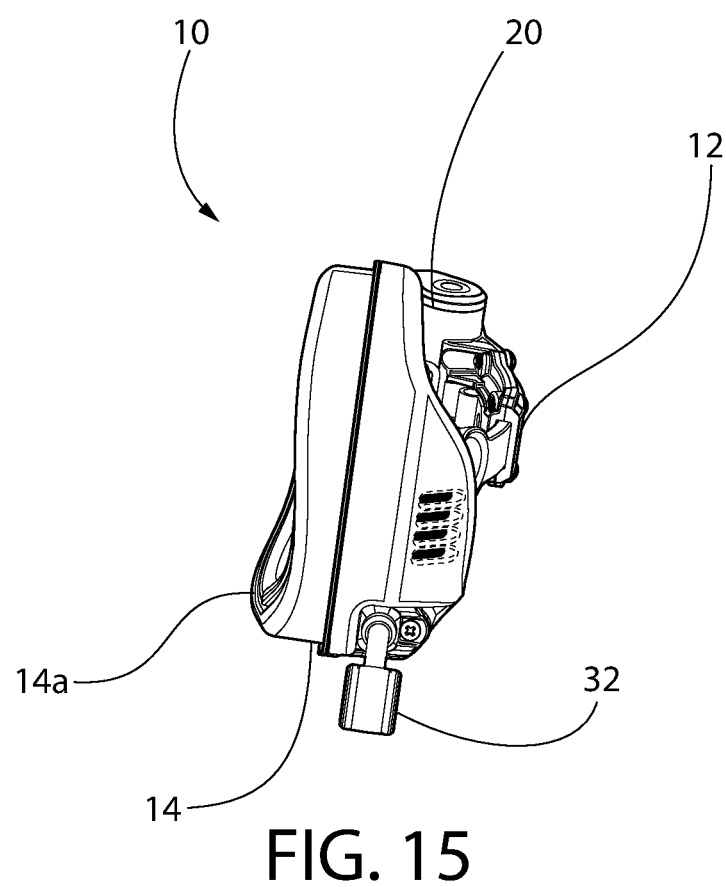
FIG. 15 is a front view of the helmet mounted headset of FIG. 1.
Figure 16:
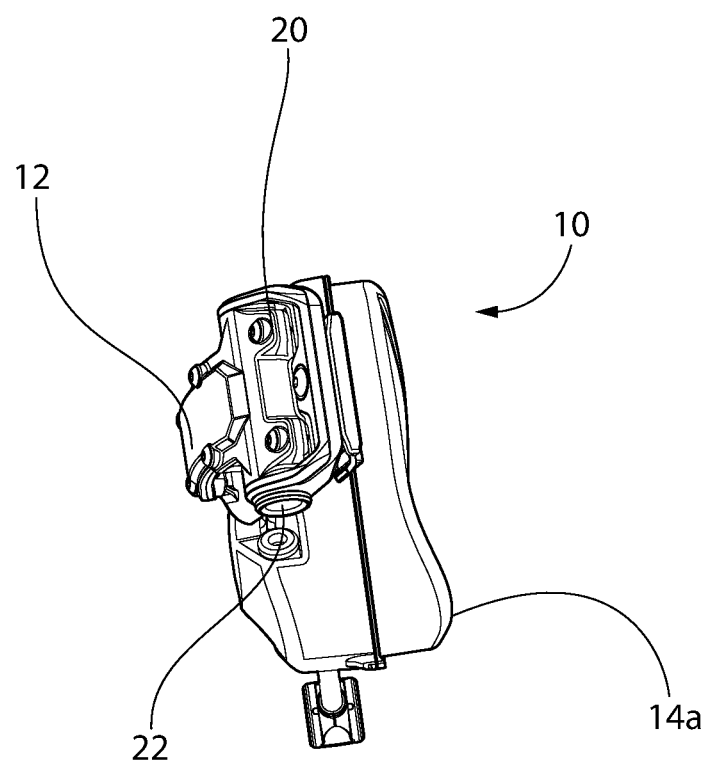
FIG. 16 is a rear view of the helmet mounted headset of FIG. 1.
Figure 17:
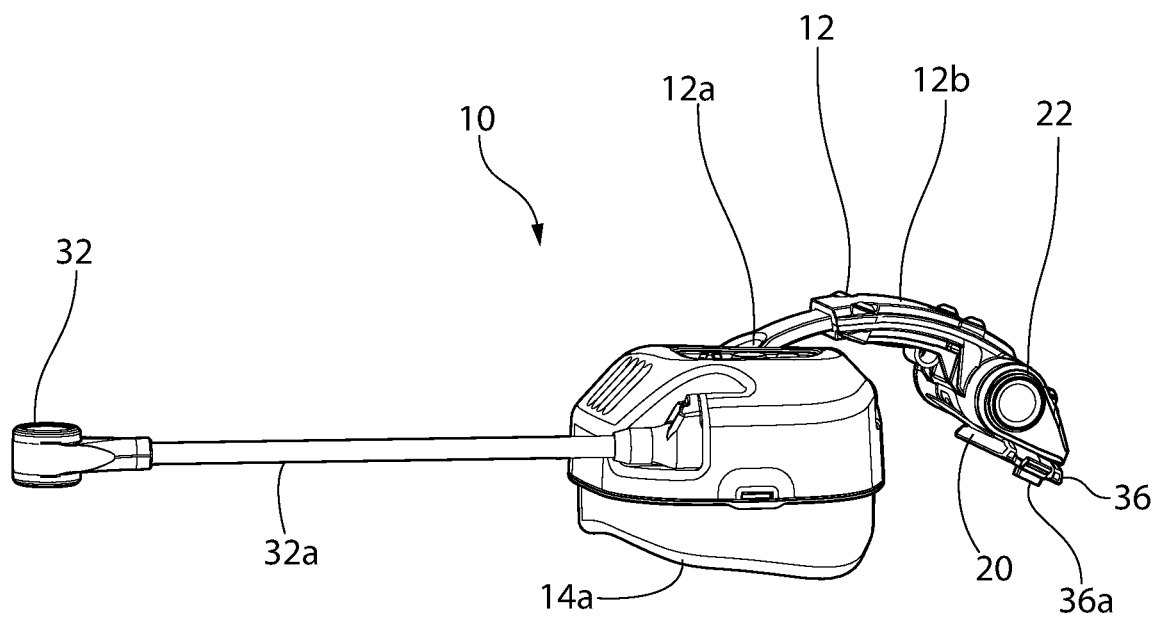
FIG. 17 is a bottom view of the helmet mounted headset shown in FIG. 1.
Figure 18:
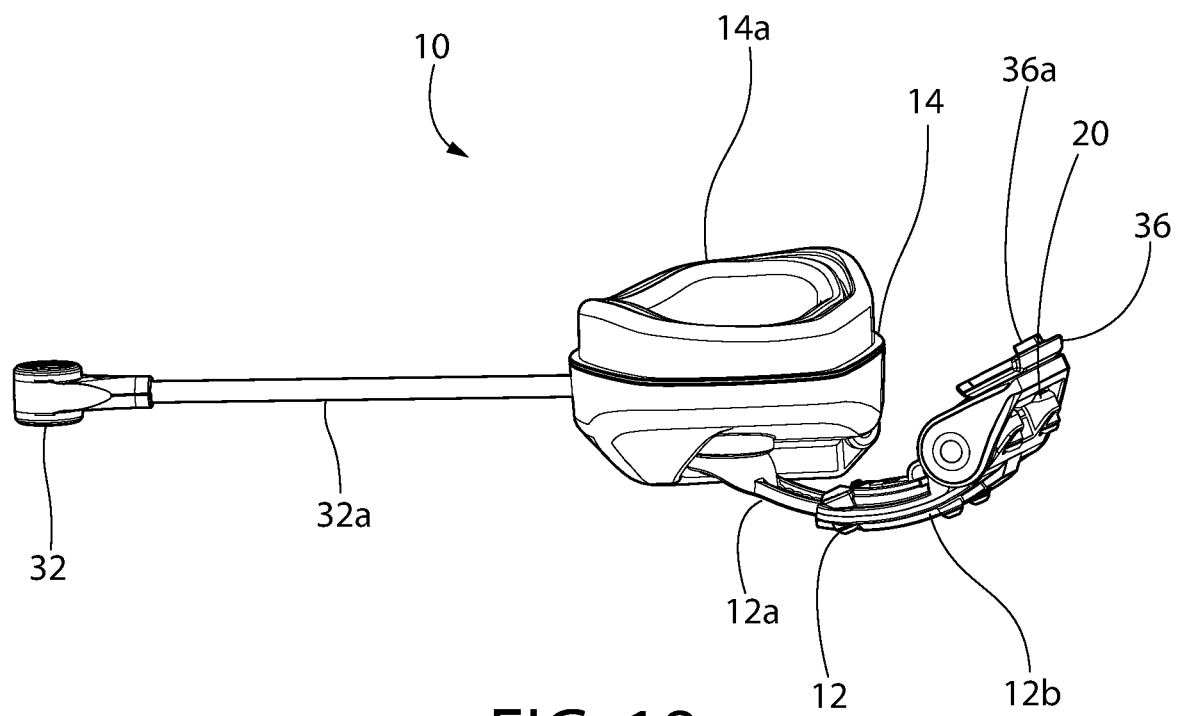
FIG. 18 is a top view of the helmet mounted headset shown in FIG. 1.

Referring to FIGS. 10 and 11, the hinge 20 may be spring biased by one or more torsion springs 24 that spring bias the arm 12 toward the user. The release 22 may include a shaft 22a. In one embodiment, the release 22 includes a button 22b on the end of the shaft 22a. The shaft 22a may be positioned along the second axis A2. In one embodiment, the shaft 22a extends through the one or more torsion springs 24. The shaft 22a of the release button 22 may be spring biased downwardly by a biasing member 28 such as a spring. The shaft 22a may be coupled to a protrusion 26 coupled to the arm 12. In one embodiment, the protrusion 26 is configured to slide vertically with the shaft 22a but not translate horizontally or rotate. The protrusion 26 may extend through the lock 30. The lock 30 may include a multi-lobed plate. The lock 30 may include three or more slots or lobes 30a, 30b, 30c that are configured to receive the protrusion 26. In one embodiment, the length of the slot 30a, 30b, 30c controls how far the protrusion 26 may move and therefore how far the arm 12 can rotate. For example, when the protrusion 26 is in the first slot 30a, the arm 12 is free to rotate toward the user's head. In one embodiment, the ear cup 14 abuts against the user's ear before the protrusion abuts against the end of the first slot 30a.

When the user grasps the ear cup 14 and rotates the ear cup 14 about the second axis A2, the lock 30 is rotated relative to protrusion 26 until the spring biased shaft 22a slides the protrusion 26 into the second slot 30b. The second slot 30b may be configured such that the arm 12 is retained by the second slot 30b rather than the user's ear. Once retained by the second slot 30b, the ear cup 14 is spaced from the user's ear. The ear cup 14 may be further rotated about the second axis A2 such that the lock 30 is rotated until the protrusion is retain in the third slot 30c. By pushing the release button 22, the protrusion 26 is moved from the second slot 30b or the third slot 30c into the first slot 30a allowing the ear cup 14 to contact the user's ear. Alternatively, when the arm 12 is retained by the third slot 30c, the arm 12 can be rotated about the first axis A1 and into the stowed position. Once in the stowed position, the release button 22 may be actuated to spring bias the ear cup 14 against the back of the helmet 18. In other embodiments, the lock 30 includes one or two slots to retain the arm 12 in a single locked position. In other embodiments, the lock 30 includes four or more slots to allow for additional positioning of the ear cup 14 relative to the user and/or helmet 18.

Figure 2:
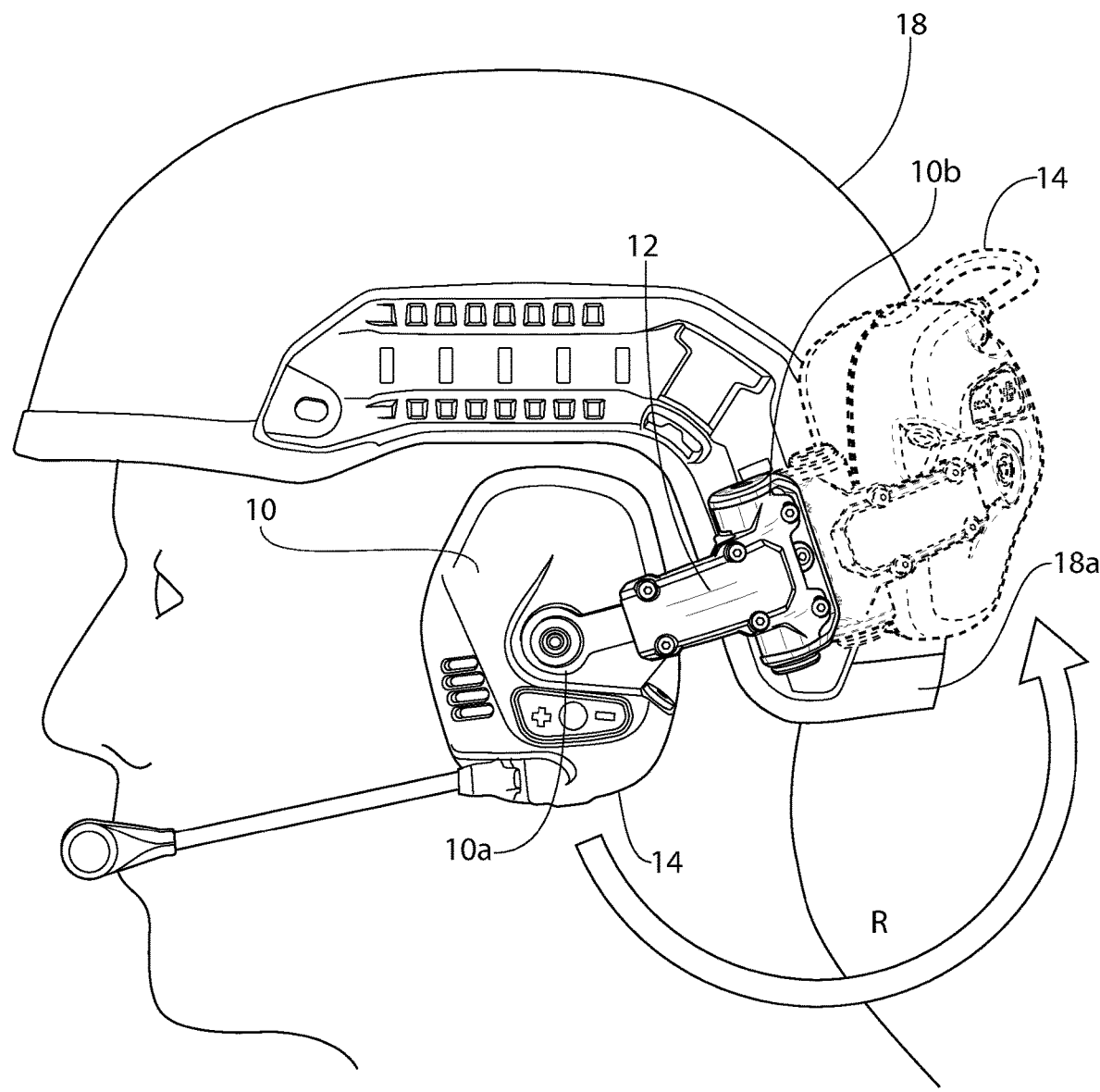
FIG. 2 is a side view of the helmet mounted headset of FIG. 1 shown attached to a helmet in the deployed position or locked position and illustrating the movement to the stowed position.

Referring to FIGS. 2, 6 and 7, the first end 10a may be freely rotatable about the first axis A1 of the hinge 20 from the locked position to the stowed position. In one embodiment, the first end 10a is retained in place relative to axis A1 by the spring bias of hinge 20 moving the ear cup against the user in the deployed position and against the helmet in the stowed position. The lock 30 may be released in the stowed position such that the ear cup 14 is urged against the surface of the helmet 18 to retain the ear cup 14 in the stowed position. In one embodiment, the ear cup 14 does not clear the helmet 18 in the locked position so that the ear cup 14 must be further rotated against the biasing force about axis A2 to move the ear cup 14 to the stowed position, the biasing force urging the ear cup 18 against the back surface 18a of the helmet 18. When the user is ready to deploy the ear cup 14, the ear cup 14 may moved away from the helmet 18 by rotating the ear cup 14 relative to the second axis A2, then rotating the ear cup 14 about the first axis A1 (see the reverse of direction arrow R in FIG. 2) until the ear cup 14 is positioned over the user's ear and then releasing the lock using the release button 22 (see direction arrow B in FIGS. 6 and 7) to bias the ear cup 14 around the user's ear (see direction arrow C in FIGS. 6 and 7).

In one embodiment, friction in the hinge 20 and/or friction between hinge 20 and end 10b retains the arm 12 in the desired location following adjustment by the user. The friction force may sufficiently high to retain the ear cup 14 in normal operating conditions such as movement of the head while sufficiently low to allow the user to adjust the position of the ear cup 14 relative to the helmet 18 with one hand. In other embodiments, the hinge 20 includes a locking mechanism to retain the hinge 20 in the desired angular position relative to axis A1. In one embodiment, arm 12 is rotatable about axis A1 relative to second end 10b approximately 180 degrees. In one embodiment arm 12 is rotatable about axis A2 relative to second end 10b 360 degrees. In other embodiments, arm 12 and/or hinge 20 includes a stop to limit the amount of rotation of arm 12 about axis A2 relative to second end 10b. For example, a stop may be provided to limit the rotation of arm 12 about axis A2 relative to second end 10b when the ear cup 14 extends over a back surface 18a of the helmet 18.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A pivot-arm assembly for attaching an ear cup to a mounting feature on an exterior of a helmet, the pivot-arm assembly comprising:
   a mount having parallel sides and configured to releasably couple to the mounting feature;
   an arm having a first end configured to couple to the ear cup and a second end;
   a hinge having two degrees of rotational freedom coupled to the second end of the arm and disposed between the arm and the mount and wherein the hinge is rotatable about a first axis and about a second axis, wherein the second axis extends generally perpendicular to the arm on a plane generally parallel to the parallel sides and the first axis extends generally perpendicular to the second axis, wherein the hinge is rotatably coupled to the second end of the arm such that the first end of the arm is rotatable relative to the mount about the first axis and the first end of the arm is rotatable relative to the mount about the second axis;
   a biasing member coupled to the arm and the mount, the biasing member configured to bias the first end of the arm relative to the mount in a rotatable direction about the second axis of the hinge; and
   wherein, in a start position, the first end of the arm is biased toward a wearer's head via the biasing member such that the first end of the arm is disposed proximate a wearer's ear and the ear cup is pressed against the wearer's head,
   wherein, in a first locked position, the first end of the arm is rotatable about the second axis in a first direction toward the second locked position and away from the first locked position such that the ear cup is spaced a first distance away from the wearer's head and the first end of the arm is releasably retained such that it is prevented from rotating in a second direction opposite the second locked position until selective actuation,
   wherein, in a second locked position, the first end of the arm is rotatable about the second axis in the first direction such that the ear cup is spaced a second distance away from the wearer's head, the second distance being greater than the first distance, and the first end of the arm is releasably retained such that it is prevented from rotating in the second direction until selective actuation.

2. The pivot-arm assembly of claim 1, wherein the lock includes a plate having a multi-lobed slot and a spring-biased protrusion extending through the multi-lobed slot, the protrusion being engageable with the multi-lobed slot such that the protrusion can slide within one or more lobes of the multi-lobed slot to a plurality of protrusion positions for controlling the rotation of the first end of the arm relative to the mount, wherein, when the protrusion engages a first lobe of the multi-lobed slot in a first protrusion position, the first end of the arm is rotatable in each of the first and second directions, and wherein, in the first locked position, the protrusion engages a second lobe of the multi-lobed slot in a second protrusion position.

3. The pivot-arm assembly of claim 2, wherein, in the second locked position, the protrusion engages a third lobe of the multi-lobed slot in a third protrusion position.

4. The pivot-arm assembly of claim 2, wherein the multi-lobed slot is shaped and configured so that rotational movement of the first end of the arm about the second axis causes the lock to transition from the first protrusion position to the second protrusion position.

5. The pivot-arm assembly of claim 3, wherein the multi-lobed slot is shaped and configured so that rotational movement of the first end of the arm about the second axis causes the lock to transition from the second protrusion position to the third protrusion position.

6. The pivot-arm assembly of claim 2, wherein the release is coupled to the protrusion, and wherein depression of the release urges the protrusion into the first protrusion position.

7. The pivot-arm assembly of claim 1, wherein the mounting feature includes a dovetail groove with at least a portion of the dovetail groove positioned on the helmet behind a wearer's ear, the parallel sides of the mount forming a dovetail projection configured to mount in the dovetail groove.

8. The pivot-arm assembly of claim 1, wherein the hinge is a first hinge, the pivot-arm assembly further comprising:
a second hinge coupled to the first end of the arm.

9. The pivot-arm assembly of claim 8, wherein the second hinge includes a gimbal attachment.

10. The pivot-arm assembly of claim 1 further comprising:
the ear cup coupled to the first end.

11. The pivot-arm assembly of claim 1, wherein the first end is selectively rotatable about the first axis of the hinge and retained in a selected rotated position relative to the mount via a friction force.

12. The pivot-arm assembly of claim 1, wherein the biasing member includes a torsion spring.

13. The pivot-arm assembly of claim 1, wherein, in the first locked position, the first end of the arm is positioned at a first angle relative to the mount, and
wherein, in the second locked position the first end of the arm is positioned at a second angle relative to the mount, the second angle being greater than the first angle.

14. The pivot-arm assembly of claim 1, wherein each of the first axis and the second axis is perpendicular to the arm.

15. The pivot-arm assembly of claim 1, wherein the release is selectively actuated by moving the release along the second axis.

16. The pivot-arm assembly of claim 3, wherein each of the first lobe, the second lobe, and the third lobe are positioned in a vertical arrangement such that the first lobe is positioned above the second lobe and the second lobe is positioned above the third lobe, and
wherein each of the first lobe has a horizontal length greater than a horizontal length of the second lobe, and the horizontal length of the second lobe is greater than a horizontal length of the third lobe.

17. The pivot-arm assembly of claim 3, the protrusion is movable from the first protrusion position to the second protrusion position or the third protrusion position via a pulling force exerted on the first end of the arm in the first direction, and
wherein actuation of the release causes movement from the third protrusion position to the second protrusion position or the first protrusion position.

18. The pivot-arm assembly of claim 1, wherein the release comprises a lever or a knob.

19. The pivot-arm assembly of claim 1, wherein, in the first locked position, the first end of the arm is positioned at a first angle relative to the mount,
wherein, in the second locked position, the first end of the arm is positioned at a second angle relative to the mount, and
wherein the second angle is larger than the first angle.

20. The pivot-arm assembly of claim 19, wherein the first angle is approximately 40 degrees and the second angle is approximately 60 degrees.

21. The pivot-arm assembly of claim 1, further comprising a stowed position, wherein, in the stowed position, the first end of the arm is rotatable relative to the mount about the first axis such the ear cup is positioned over a back portion of the helmet.

22. The pivot-arm assembly of claim 1, wherein the release extends downwardly from the hinge such that at least a portion of the release is disposed on an exterior of the pivot-arm assembly.

23. A pivot-arm assembly for attaching an ear cup to a mounting feature of a helmet, the pivot-arm assembly comprising:
an ear cup;
a mount having parallel sides and configured to releasably couple to the mounting feature on the helmet;
an arm having a first portion coupled to the ear cup, the arm having a second portion moveably coupled to the first portion to adjust a length of the arm; and
a hinge having two degrees of rotational freedom, the hinge having a first part coupled to the mount and rotatable about a first axis and a second part coupled to the second portion of the arm and rotatable about the second axis, wherein the second axis extends generally perpendicular to the arm and along a plane generally parallel to the parallel sides and the first axis extends generally perpendicular to the second axis, the first portion of the arm is rotatable relative to the mount about the first axis and the first portion of the arm is rotatable relative to the mount about the second axis, the second part of the hinge having a torsion spring coupled to the first portion of the arm and configured to spring bias the first portion of the arm relative to the mount in a rotatable direction about the second axis of the hinge,
wherein, in a start position, the first portion of the arm is biased toward a wearer's head via a biasing member such that the first portion of the arm is disposed proximate a wearer's ear and the ear cup is pressed against the wearer's head,
wherein, when the first portion of the arm is retained in a first locked position the first portion of the arm is rotatable about the second axis in a first direction toward a second locked position and away from the first locked position such that the ear cup is spaced a first distance away from the wearer's head and the first portion of the arm is releasably retained such that it is prevented from rotating in a second direction opposite the second locked position until selective actuation, and wherein, when the lock releasably retains the first portion of the arm in the second locked position, the first portion of the arm is rotatable about the second axis in the first direction such that the ear cup is spaced a second distance away from the wearer's head, the second distance being greater than the first distance, and the first portion of the arm is releasably retained such that it is prevented from rotating in the second direction until selective actuation.

24. The pivot-arm assembly of claim 23 further comprising:
a stowed position defined by when the mount is mounted to the mounting feature and the ear cup is positioned over a back portion of the helmet, the ear cup is biased against the back portion of the helmet.

25. The pivot-arm assembly of claim 23, wherein, in the first locked position, the first portion of the arm is positioned at a first angle relative to the mount,
wherein, in the second locked position, the first end of the arm is positioned at a second angle relative to the mount, and
wherein the second angle is larger than the first angle.

* * * * *